United States Patent [19]
Rogers

[11] Patent Number: 5,662,479
[45] Date of Patent: Sep. 2, 1997

[54] APPARATUS AND METHOD TO AID IN THE TEACHING OF THE CONCEPT OF TIME

[76] Inventor: Janice L. Rogers, 7695 Cayuga Dr., Cincinnati, Ohio 45243

[21] Appl. No.: 614,520

[22] Filed: Mar. 13, 1996

Related U.S. Application Data

[63] Continuation-in-part of Ser. No. 35,618, Mar. 3, 1995, Pat. No. Des. 369,619.

[51] Int. Cl.$^6$ .................................. G09B 19/12
[52] U.S. Cl. ............................................ 434/304
[58] Field of Search ....................... 434/304; 367/77, 367/233, 234

[56] References Cited

U.S. PATENT DOCUMENTS

| | | | |
|---|---|---|---|
| D. 043,733 | 3/1913 | Buckland | D10/26 |
| D. 268,686 | 4/1983 | Wolf | D19/64 |
| D. 271,567 | 11/1983 | Powell | D10/26 |
| D. 298,609 | 11/1988 | Dawson, Jr. | D10/26 |
| D. 346,965 | 5/1994 | Wolff | D10/26 X |
| D. 347,656 | 6/1994 | Bumbarger | D19/64 |
| 680,018 | 8/1901 | Broke | 434/304 |
| 776,297 | 11/1904 | Cordeiro | 434/304 |
| 2,011,517 | 8/1935 | Goeffrion | |
| 2,255,188 | 9/1941 | Rieper | |
| 2,816,373 | 12/1957 | Caddy | |
| 3,608,214 | 9/1971 | Rancati | |
| 3,668,858 | 6/1972 | Hartwig | 368/77 |
| 3,803,831 | 4/1974 | Horzick | |
| 4,368,045 | 1/1983 | Kuh | |
| 4,885,731 | 12/1989 | Massaro | 434/304 |
| 4,945,522 | 7/1990 | Radel | 368/77 |
| 5,044,961 | 9/1991 | Bruskewitz | 434/304 |

FOREIGN PATENT DOCUMENTS

3731872   8/1988   Germany .................. 368/77

*Primary Examiner*—Paul J. Hirsch
*Attorney, Agent, or Firm*—Wood, Herron & Evans

[57] ABSTRACT

A time teaching aid for teaching the concept of remaining time and elapsed time comprises a stationary face with a plurality of numerical indicia marks arranged around the face in a generally clockwise pattern, and successive indicia marks decreasing in value in a clockwise direction from a twelve-o'clock position. A rotating face rotates in the clockwise direction on the stationary face and exposes a portion thereof in front of the stationary face during rotation. A time hand rotates in synchronization with the rotating face and points to the numerical indicia marks on the stationary face. The rotating face exposes an ever decreasing portion thereof during clockwise rotation and the time hand progresses in a clockwise fashion from the twelve-o'clock position, through the numerical indicia marks, and back to the twelve-o'clock position, such that the ever-decreasing exposed portion corresponds to the time hand pointing to decreasing values of the numerical indicia whereby to simultaneously indicate to a viewer the decreasing time remaining both proportionately and numerically on the stationary face.

17 Claims, 2 Drawing Sheets

1

APPARATUS AND METHOD TO AID IN THE TEACHING OF THE CONCEPT OF TIME

RELATED APPLICATIONS

This application is a continuation-in-part application of parent design application U.S. Ser. No. 29/035,618 entitled "Elapsed Time Teaching Aid" and filed Mar. 3, 1995, now U.S. Design Pat. No. 369,619 which parent application is incorporated herein by reference in its entirety.

FIELD OF THE INVENTION

The present invention relates generally to an apparatus and method for teaching time, and particularly to an apparatus and method to teach the concept of remaining time and elapsed time to persons, such as young children or mentally challenged individuals, who are not familiar with the concept of clock time.

BACKGROUND OF THE INVENTION

The concept of time is a very important concept utilized throughout everyday life. For example, most people earn a living according to the time they spend at a certain occupational endeavor or vocation. Furthermore, business meetings, school classes, sporting events and innumerable other daily life activities are focussed around time.

However, the importance of time is not reserved only for adults, but also must be impressed upon school age children, and particularly very young school age children. Furthermore, mentally/challenged individuals, whether adult or child, must be as familiar as possible with the concept of time, in order to be acclimated into as normal a lifestyle as possible. Therefore, it is very important for people to learn how to tell time and preferably to learn at an early age. Since clocks with traditional faces are still the predominant time pieces is use today, telling time from a clock face is particularly important. To that end, tools for teaching the concept of time are useful.

Young children and others not familiar with traditional clocks are usually exposed to a number of different timing implements, such as small hour glasses filled with sand utilized to play games, as well as timers, such as food timers or timers on microwaves and ovens, which ring or buzz when time has expired. However, neither of these devices are very helpful in providing a correlation to elapsed time or remaining time on a clock face. Rather, they utilize a single incidence, i.e., the sand running out or the ringing/buzzing noise to indicate that the time for particular task has expired. Furthermore, many of the available clocks and watches used today are digital and provide no guidance to a person learning to tell time, other than giving the exact numerical time. Digital time devices are not correlated to a clock face and thus are not very good teaching tools.

The other available option for teaching time is simply to utilize a normal clock with an hour hand and a minute hand. However, the time concept as presented by a traditional clock face is somewhat abstract and hard to understand from the, simple perspective of a child or a mentally challenged individual because the hands seem to progress around the clock face with no indication of a start position or a stop position. For that reason, many children and mentally challenged individuals are frustrated with determining the exact time, the remaining time, or the elapsed time from a traditional clock. While the ultimate goal is to be able to tell time from a traditional clock face, a more simple and concrete example of time is needed for teaching and for the eventual progression to the clock face with the minute and hour hands.

Accordingly, there is a need in the art for an apparatus and method which will more readily and more easily teach young children and mentally challenged individuals the concept of time. To that end, it is an objective of the present invention to facilitate teaching of the concept of time.

It is a further objective of the present invention to teach the concept of remaining time for a particular task and also elapsed time from the moment the task was begun.

It is still another objective of the present invention to reduce the abstract concept of clock time to something more concrete and teach a child or person the "feel" of remaining and elapsed time. To that end, it is desirable to provide a visual indication of time.

It is another objective of the invention to give a person the experience that remaining time has expired and that time for a particular task has completely expired without having the person know how to tell the exact time on a clock face.

It is still another objective of the present invention to teach the concept of remaining time and elapsed within the confines of a traditional clock face so that the transition from remaining or elapsed time to telling exact time from a traditional clock face is more comfortable and natural.

SUMMARY OF THE INVENTION

The time teaching apparatus and method of the present invention addresses the above objectives and other needs in the prior art by providing a viewer, such as a young child or mentally challenged person, the ability to readily visually associate numerical remaining time values with the decreasing size of the exposed portion of a clock face.

More particularly, the time teaching aid comprises a generally flat stationary face which is preferably vertically supported for easy viewing. The stationary face is formed of a first color or tone, preferably a light color or tone, and includes a plurality of numerical indicia marks arranged around the face in a generally clockwise pattern. In a preferred embodiment, the indicia marks are between zero and sixty (0–60) and indicate, for example, sixty minutes within an hour or sixty seconds within a minute, although other time periods might also be utilized.

The indicia marks progress in increasing numerical value in a counter clockwise direction, or rather in decreasing numerical value in a clockwise direction. A maximum value numerical indicia mark, such as sixty (60) minutes, is located proximate a twelve-o'clock position on the stationary face and a minimum value numerical indicia mark, such as zero (0) minutes, is also located proximate the twelve-o'clock position. In a preferred embodiment, the maximum value and minimum value numerical indicia marks or positions are located at generally the same twelve-o'clock position. Between the maximum and minimum value indicia marks, successive numerical indicia marks are positioned on the first color clock face, preferably in increments of five (5), at the traditional positions of the numbers on a traditional clock face.

To physically display the remaining time and to correlate that display with a numerical value, the time teaching aid further comprises a rotating face of a second color or second color tone which generally contrasts with said first color or first color tone. For example, a stationary face might be white while the rotating face is black or the stationary face might be a light color tone while the rotating face is the same color yet a darker tone. The purpose is to provide a contrast between the stationary face and the rotating face with the rotating face preferably being a darker color or tone.

The rotating face is smaller than the stationary disk and is arranged generally concentrically with the stationary face to rotate therearound. The rotating face is coupled to a time device and rotates at a rate corresponding to the time period indicated on the stationary face, such as sixty seconds or sixty minutes. As the rotating face rotates, it exposes an ever-decreasing portion thereof in front of the stationary face. In a preferred embodiment of the invention, the rotating face disappears behind the stationary face such that the remaining time on the apparatus is physically and visually illustrated by the ever-decreasing size of the exposed portion of the rotating face, which is exposed on the stationary face and set off by the varying colors or tones presented by the faces. In that way, the person or child viewing the time teaching aid will associate the decreasing size of the exposed portion with the decreasing remaining time for completing a particular task. The rotating face, which is preferably round, will resemble a pie, and the exposed portion will generally be pie-shaped. Pie-shaped objects are often well recognized by young children and others as indicating certain proportions, and thus the pie-shaped rotating face portion will readily indicate to a viewer the decrease in the remaining time.

In a preferred embodiment, the stationary face is radially slotted outwardly from the center at the twelve-o'clock position. The rotating face also is radially slotted and is configured to interact with the slotted stationary face such that the rotating face disappears behind the stationary face as time progresses. A leading edge of the rotating face, as defined by the radial slot, directs the rotating face behind the stationary face such that the rotating face disappears at the twelve-o'clock position. The distance between the twelve-o'clock position on the stationary face and the trailing edge of the slotted rotating face then indicates the time remaining before the time is officially expired. In that way, time is presented proportionally in a very visual and easy to understand manner. Furthermore, the viewer is directed to the importance of the twelve-o'clock position which, on a traditional clock, is the position of the minute hand in the changing of the hour and is the position of the hour hand in changing from A.M. to P.M. and the changing of the day.

To correlate the disappearing or decreasing pie-shaped portion of the rotating face to a traditional clock, the time teaching aid further includes a time hand which is operable to rotate in synchronization with the rotating face and preferably is coupled to the trailing edge of the rotating face. The time hand is configured to point to a numerical indicia mark along the stationary face as the rotating face rotates and disappears. In that way, as the rotating face trailing edge and the time hand progress in a clockwise fashion around the stationary face, the visual pie-shaped exposed portion is correlated to an actual number and to a decreasing number. As the trailing edge and time hand progress from the maximum value indicia mark to the minimum value indicia mark, the decreasing size of the pie-shaped exposed portion corresponds to the time hand pointing to decreasing values of the numerical indicia marks on the stationary face. Therefore, the invention simultaneously indicates to a viewer the decreasing time remaining both proportionately in a visual sense and numerically on the stationary face.

A child or other individual will readily associate the decreasing remaining numerical time with the visually decreasing size of the exposed pie-shaped portion of the rotating face. Furthermore, the mental correlation between the clock hand and decreasing time and decreasing numerical indicia is provided to foster understanding of the traditional clock hands and a clock face. Transition to a traditional clock and actually telling twelve-hour time is made much more smoothly by the viewer using the time teaching aid of the invention.

To teach the concept of time in accordance with the methodology and principles of the invention, the rotating face is rotated counterclockwise so that the darker or contrasting rotating face generally covers a circular or disk-shaped portion of the stationary face a full 360°. The trailing edge of the face and the time hand are positioned at the maximum numerical indicia mark at the twelve-o'clock position. As time elapses, the rotating face and time hand progress in a clockwise direction similar to a traditional clock. As it progresses, the rotating face disappears behind the stationary face such that the exposed pie-shaped portion of the rotating face decreases while the exposed portion of the stationary face, which was previously covered by the rotating face, increases. The increasing exposed portion of the stationary face is focused upon by a teacher to draw the students' attention to the increasing amount of time which has elapsed. In that way, elapsed time may be taught. To teach remaining time, the teacher focuses the student on the pie-shaped exposed portion of the rotating face. As the rotating face disappears and the exposed pie-shaped portion gets smaller, the teacher focuses attention on the decreasing numerical values on the stationary face indicated by the hand. The proportional remaining time is correlated to the numerical remaining time.

The time teaching aid of the invention provides very concrete presentation of remaining and elapsed time by correlating the rotating face and the exposed pie-shaped portion to the numerical values and indicia that are normally found on a traditional clock face. Therefore, a smooth educational progression is provided when later teaching a person how to tell exact time from a traditional clock face having a minute hand and an hour hand. The exposed pie-shaped portion and the decreasing size of that pie portion as time elapses is a physical and proportional concept which is readily grasped by children and mentally challenged individuals and will teach them what remaining time and elapsed time looks like or, more importantly, "feels" like.

The above and other objectives and advantages of the present invention shall be made apparent from the accompanying drawings and the description thereof.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

The time teaching aid 10 of the invention comprises a generally rectangular body 12 including, on a front side thereof, a generally flat stationary face 14. The stationary face 14 is preferably of a first color or first color tone which will provide a background for the time teaching aid of the invention.

The teach aid 10 further comprises a plurality of numerical indicia marks 16 which are arranged around the flat stationary face 14 in a generally circular pattern similar to a traditional clock face. The numerical indicia marks are contained within a perimeter line 18 for defining a circular section of the stationary face 14.

The numerical indicia marks 16 indicate units of time which will depend upon the timing mechanism utilized in the teaching aid 10 as discussed further hereinbelow. In the preferred embodiment illustrated in the figures, the indicia marks have numerical values in the range of zero to sixty (0–60). Therefore, the teaching aid 10 may be utilized to teach the concept of 60 seconds elapsed for one minute or 60 minutes elapsed for one hour.

Figure 1:
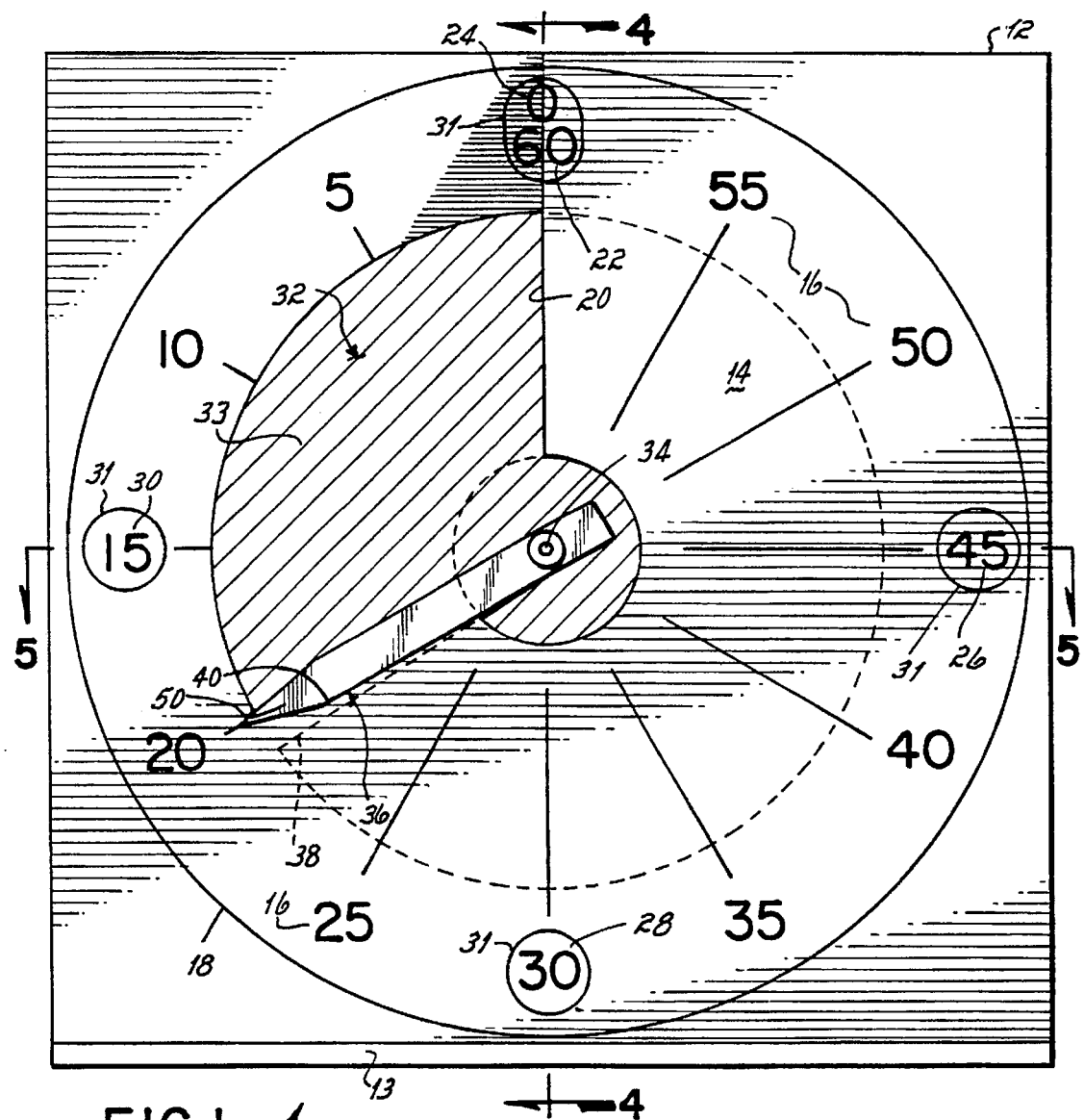
FIG. 1 is a front elevational view of the time teaching aid of the present invention.

The twelve-o'clock position on stationary face 14 indicates the position of the maximum value indicia mark and the minimum value indicia mark. Preferably, the maximum and minimum value indicia marks will co-exist at the same twelve-o'clock position indicated by slot line 20. As illustrated in FIG. 1, the maximum value indicia mark 22, which, in the embodiment illustrated, is numeral 60, might be utilized with a minimum value indicia mark 24, such as the numeral 0. Preferably, one or the other is utilized, instead of both, to prevent any kind of confusion on behalf of the students viewing the time teaching aid 10. In a preferred embodiment, zero (0) is utilized as the minimum value indicia mark 24 and small children and others are very familiar with zero as indicating none or nothing, and thus, no remaining time.

In the preferred embodiment, the numerical indicia marks are divided into units of five (5) between zero (0) and sixty (60). The quarter-hour numerical indicia marks 26, 28 and 30 which are noted with units 45, 30 and 15, respectively, are set off, such as by circles 31 to familiarize a student with those positions on a clock face. Time is often taught on a clock face, at first, in 15 second or 15 minute intervals, such as, one-quarter hour past, one-half hour past, one-quarter hour until some particular hour. The demarcation of these numerical indicia marks acclimates the student with their importance. As will be appreciated, other units might be used, such as at intervals of one (1) instead of five (5). Furthermore, the maximum and minimum value indicia marks 22, 24 may also be offset by circles 31.

In accordance with the principles of the present invention, the time teaching aid 10 further comprises a rotating face 32 which is preferably a second color or second color tone which contrast with the first color or first color tone of stationary face 14. For example, rotating face 32 might be black while the stationary face 14 may be white. Similarly, rotating face 32 might be a dark color tone while the stationary face 14 may be a lighter tone of a similar color. Preferably, the rotating face 32 is darker, either in color or tone, than the stationary face 14, to delineate the rotating face 32 from the stationary face 14.

Figure 2:
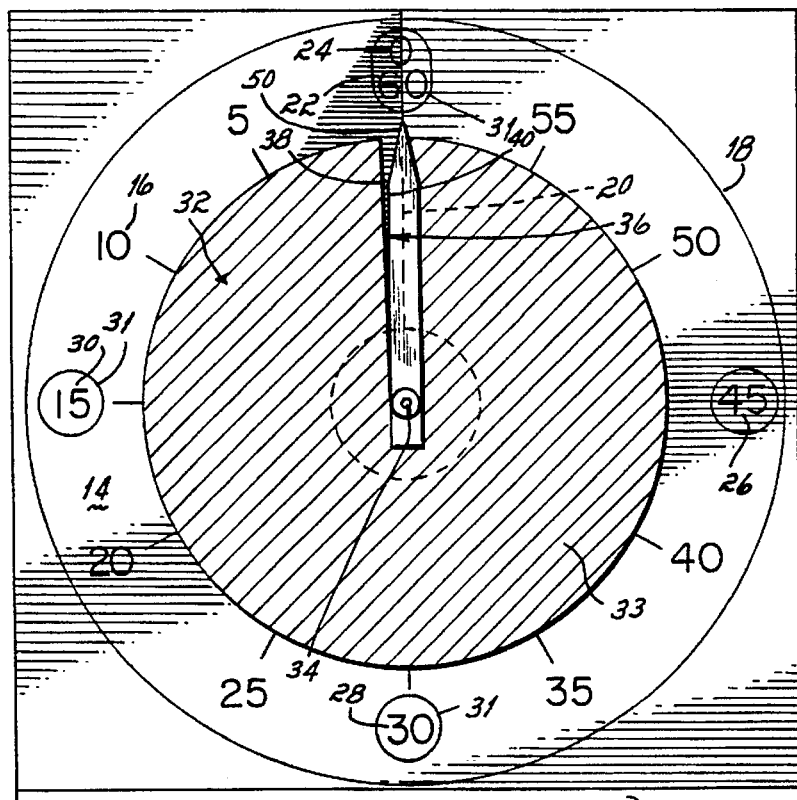
FIG. 2 is a front elevational view of the rotating face and time hand of the time teaching aid of the invention.
Figure 3:
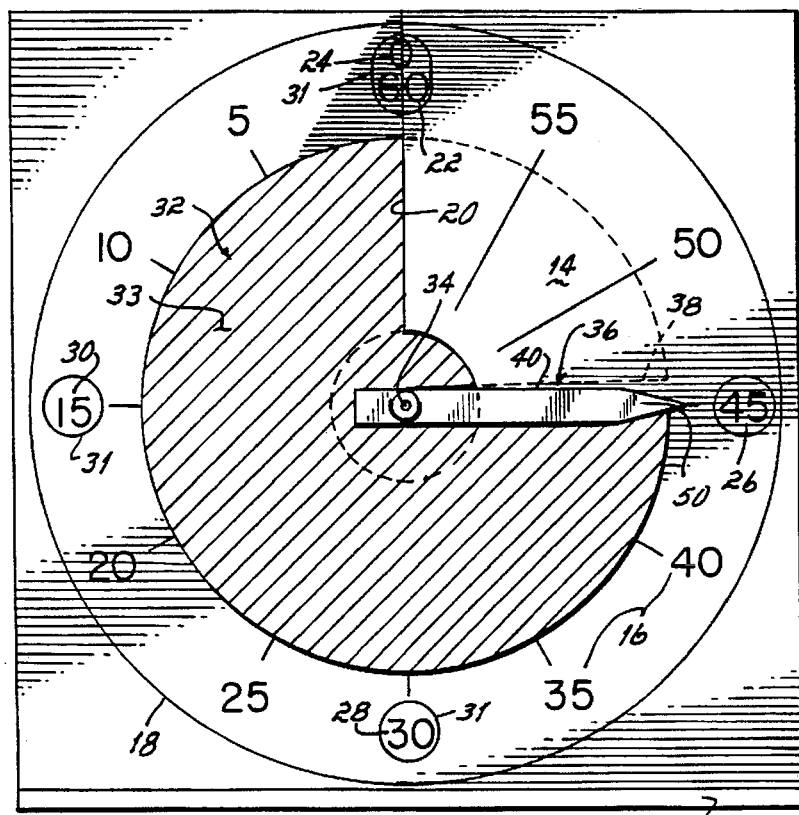
FIG. 3 is a front elevational view, similar to FIG. 1, indicating 45 units of remaining time and 15 units of elapsed time; and, FIG. 4 is a sectional view, taken along lines 4—4 of FIG. 1.
Figure 4:
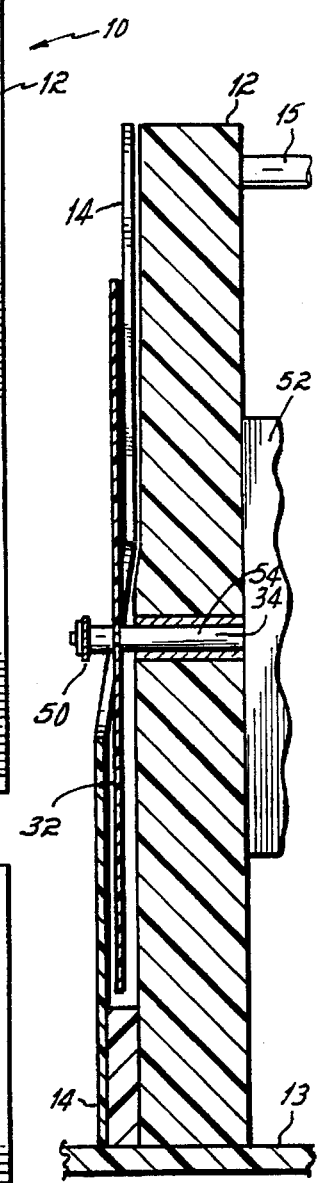

The rotating face 32 is concentrically mounted with stationary face 14 to rotate around a center axis line 34. Referring to FIG. 2, the rotating face 32 is slotted by a slot 36 for interacting with the stationary face 14 as described further hereinbelow. Slot 36 defines a rotating face leading edge 38 and rotating face trailing edge 40. The leading edge 38 for rotating face 32 fits into a slot defined by slot line 20 in the stationary face 14 such that as the rotating face 32 rotates around axis 34 on a clockwise direction, the rotating face 32 disappears behind the stationary face 14 (see FIGS. 3 and 5). As the rotating face 32 rotates in a clockwise direction, the exposed portion of the rotating face, defined as that portion between slot 20 and trailing edge 40 is ever decreasing. As illustrated in FIGS. 1 and 3, the exposed portion takes on the shape of a pie piece, which is generally well recognized by young children as an indicator of portions and proportions on a circular object. In that way, the student will readily recognize remaining time as an ever decreasing pie-shaped exposed portion of the rotating face in front of the stationary face. Eventually, as the remaining time decreases to zero (0), the entire rotating face 32 will disappear behind stationary face 14.

Figure 5:
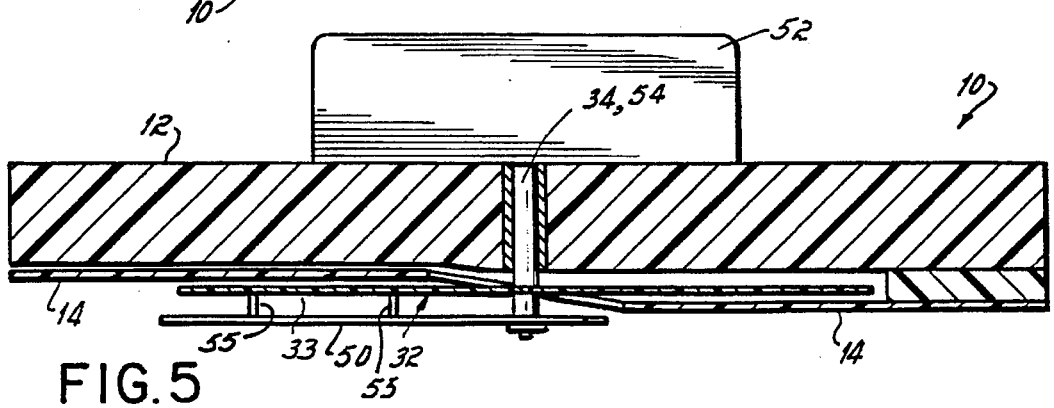
FIG. 5 is a sectional view taken along lines 5—5 of FIG. 1.

FIGS. 1 and 5 shows in cross section a view of the time teaching aid 10 illustrating how the rotating face 32 disappears behind stationary face 14 at the slot 20. A sufficient portion of the stationary face 14 is raised away from body 12 so that the rotating face 32 will travel there behind. Alternatively, the stationary face may not be raised at all, and the slot 20 in the stationary face may direct the rotating face back into body 12 and behind the plane of the stationary face. In any case, the rotating face 32 and stationary face 14 are configured and concentrically mounted such that the rotating face will generally be hidden as it rotates to leave an ever-decreasing portion exposed. Preferably, the stationary face 14 will be configured at the twelve-o'clock position to capture the leading edge 38 of the rotating face.

In addition to the visual concept of time illustrated by the decreasing size of the exposed pie-shaped portion of rotating face 32, the position of slot 20 and the minimum and maximum numerical indicia 24, 22 at the twelve-o'clock position 20 further illustrates to a student the importance of the twelve-o'clock position. The twelve-o'clock position on a traditional clock face is the position of the minute hand on the changing of the hour and is the position of the hoar hand in the changing from A.M. to P.M. and in the changing of the day. Therefore, a great majority of clock faces are based upon beginning and ending at the twelve-o'clock position. For example, stop watches with time hands, which are not necessarily concerned with gauging the passage of an hour or a day still originate at the twelve-o'clock position with the second hand.

Rectangular body 12 rests upon a generally horizontally base 13 for maintaining the stationary face generally vertical. A handle 15 is attached to the top of body 12 for situating, carrying and/or tilting the clock faces 14, 32 for better viewing. The time teaching aid 10 of the invention further comprises a time hand 50 which is operable to move and rotate in synchronization with the rotating face 32. Preferably, time hand 50 is coupled to the rotating face 32 and specifically coupled in line with the trailing edge 40 of rotating face 32, such as by stand-off structures 55. Alternatively, the rotating face 32 and time hand 50 may rotate independently but in synchronization. The time hand 50 moves in a clockwise direction along with the trailing edge 40 in accordance with the principles of the present invention. Time hand 50 points to numerical indicia marks on the stationary face 14 as it rotates, and particularly, the time hand 50 points to successive numerical indicia marks of decreasing value as it rotates in a clockwise direction as illustrated in FIGS. 1 and 3.

As the rotating face 32 is operable to expose a decreasing size pie-shaped portion as it rotates in a clockwise direction, the time hand 50 progresses in a similar fashion from the maximum value indicia mark 22, or from the maximum value indicia mark position, as illustrated at the twelve-o'clock position by slot line 20, to the minimum value indicia mark 24, or to the minimum value indicia mark position (slot line 20). As discussed hereinabove, the minimum and maximum value indicia mark positions are preferably at the same twelve-o'clock position indicated by slot line 20. Furthermore, one or the other of the maximum/minimum value indicia marks 22, 24, might not be illustrated on stationary face 14. Alternatively, neither indicia marks 22, 24, might be illustrated, and the slot 20 above would indicate the start and finish position of the teaching aid 10.

The decreasing size of the exposed pie-shaped portion 33 corresponds to the time hand 50 pointing to the decreasing values of the numerical indicia marks 16 so as to simultaneously indicate to a student the decreasing amount of time remaining both proportionally and numerically along the stationary face 14. In that way, the student is presented with a concrete, proportional view of time, i.e., a pie-shaped portion 33, which may be somewhat familiar, and a numerical indication of time, i.e., time hand 50 and indicia mark 16, which may not be so familiar. The combination of elements in the teaching aid 10 of the invention promotes understanding of time on a traditional clock face.

Used within a teaching methodology, the time teaching aid 10 of the invention promotes familiarity with concepts of a time hand 50 and numerical indicia marks 16 by utilizing visual familiarity with the exposed pie-shaped portion 33. The student learns to readily associate the numerical values of the indicia marks 16 with the actual remaining time, i.e., low numbers will correspond to a small exposed portion while higher numbers will correspond to a larger exposed portion. Furthermore, utilizing a time hand 50 and promoting familiarity with a time hand and numerical marks provides a very smooth transition to a traditional clock face, which has an hour-hand, minute-hand and normally indicia marks 1–12 (or 1–24 for military clocks).

The maximum value of time remaining is indicated by pie-shaped portion 33 when time hand 50 is proximate the twelve-o'clock position with the full rotating face 32 exposed as illustrated in FIG. 2. Remaining time is expired, when the exposed pie-shaped portion 33 is reduced to nothing and the entire rotating face 32 is hidden behind the stationary face 14.

To operate, rotating face 32 and time hand 50 are coupled to an appropriate timing device 52, and preferably the same timing device, which is generally known in the art. The timing device 52 includes an internal timing mechanism (not shown) which couples to a rotating shaft 54 which, in turn, is coupled to the disk of rotating face 32 and the time hand 50. The timing device 52 will preferably provide complete shaft rotation in a time interval of sixty seconds, for timing a minute, or sixty minutes for timing an hour. Timing device 52 might be battery operated or may be wound with a key or other device (not shown). Preferably, the timing device 52 will stop the rotation of the rotating face 32 and time hand 50 upon full rotation, i.e., when the time hand 50 points to the twelve-o'clock position after rotating and the rotating face is generally completely hidden.

The time teaching aid 10 of the present invention may also be used to teach elapsed time by focusing a student upon the amount of the stationary face 14 which is uncovered by the rotating face 32. As illustrated in FIG. 1, as the rotating face 32 disappears behind the slotted line 20 in stationary face 14, a greater portion of the stationary face 14, which was previously covered by the rotating face 32, is exposed. The larger exposed portion of the stationary face corresponds to a greater amount of elapsed time.

FIGS. 1, 2 and 3 will more readily illustrate the methodology of teaching a student the concepts of remaining time and elapsed time in accordance with the principles of the present invention. Referring to FIG. 2, it will be presumed that the time hand 50 and trailing edge 40 of the rotating face 32 begin their clockwise progression from the twelve-o'clock position as indicated by the slot 20 and minimum/maximum value indicia marks of zero (0) or sixty (60). The teacher points out to the students that the entire rotating face 32 is exposed and focuses upon the full face or "full pie" 32 which overlays the stationary face 14 having numerical indicia mark 16. As time progresses, such as 15 minutes, the teaching aid 10 will appear as illustrated in FIG. 3 where one-quarter of the rotating face 32 has disappeared (¾ pie-shaped portion exposed), therefore indicating that three-quarters of the pie is the remaining time. To the student, the small amount of elapsed time and the large amount of remaining time is perceived. The time hand 50 numerically correlates the large size pie-shaped exposed portion 33 to a relatively high value numerical indicia mark 26 which indicates forty-five minutes remaining.

The teacher may also focus upon the small portion 56 of the stationary face 14 which has been exposed by the decreasing size of the pie-shaped exposed portion 33 of rotating face 32. In that way, elapsed time may be taught. To do so, the teacher would illustrate the relation between the small amount of elapsed time and the large amount of remaining time.

As the rotating face 32 and the time hand 50 further progress in a clockwise direction around the stationary face 14, various numerical indicia marks might be indicated to further provide the student with correlation between the decreasing pie-shaped exposed portion 33 and the decreasing values of the numbers pointed to by time hand 50. In FIG. 1, the time teaching aid 10 has progressed to approximately forty (40) elapsed minutes and twenty (20) minutes remaining. In that case, the pie-shaped exposed portion 33 only indicates one-third (⅓) of the total pie which students will recognize as substantially less than the three-quarters of the pie which was earlier pointed out and which is indicated in FIG. 3. The small amount of remaining time, approximately twenty (20) minutes, is visually perceived by the smaller pie-shaped portion 33. Furthermore, the decreasing numerical value of 20 is correlated to the smaller pie-shaped portion 33. The pie-shaped exposed portion 33 will become smaller and smaller as the time hand 50 approaches the minimum value indicia mark 24 to indicate that time has completely expired.

In a simplistic view, when no pie is left, no time remains. Preferably, the timing device 52 is operable such that the rotating face 32 and time hand 50 may be set at any start position to further familiarize the student with the concept of remaining time and to correlate the numerical values to the size of the pie-shaped exposed portion 33 of rotating face 32.

As illustrated in FIG. 1, the large amount of elapsed time could also be illustrated by directing the students to the amount of stationary face 14 which as been uncovered as the pie-shaped exposed portion 33 grows smaller.

In that way, the concept of time is easily and readily taught both numerically and proportionally utilizing size and shape concepts which are familiar to children and mentally challenged individuals, while at the same time, correlating the function of a time hand and the indication of numerical time values. The transition to a traditional clock face and a twelve-hour or twenty-four hour time unit is thus further facilitated for eventual progression into telling time utilizing a traditional clock or watch having hour, minute and second hands.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A time teaching aid for teaching the concept of remaining time and elapsed time to persons unfamiliar with determining time comprising:

a generally flat stationary face;

a plurality of numerical indicia marks arranged around the flat face in a generally clockwise pattern, successive numerical indicia marks decreasing in value in a clockwise direction from a twelve-o'clock position;

a rotating face operable to rotate clockwise with respect to said stationary face, the rotating face generally exposing a portion thereof in front of the stationary face during rotation;

the rotating face further operable to expose an ever-decreasing portion thereof during clockwise rotation;

a time hand operable for rotating in synchronization with said rotating face and pointing to the numerical indicia marks as the face rotates;

said time hand further operable for progressing in a clockwise fashion from the twelve o'clock position, through the decreasing numerical indicia marks and back to the twelve-o'clock position so that the ever-decreasing exposed portion of the rotating face corresponds to the time hand pointing to decreasing values of the numerical indicia marks to simultaneously indicate to a viewer the decreasing time remaining both proportionally and numerically on the stationary face;

whereby a viewer may readily visually associate numerical remaining time values with a decreasing portion of the rotating face to understand remaining and elapsed time.

2. The time teaching aid of claim 1 wherein said stationary face is slotted and said rotating face is also slotted, the rotating face rotating with respect to said stationary face and a portion of the rotating face travelling behind said stationary face as it rotates such that the rotating face disk exposes an ever-decreasing portion of the rotating face.

3. The time teaching aid of claim 2, the stationary face having a slot at approximately the twelve-o'clock position, and a leading radial edge of the slotted rotating face moving through the slot as the face rotates.

4. The time teaching aid of claim 1 wherein the rotating time hand is coupled to a radial trailing edge of the rotating face to move therewith.

5. The time teaching aid of claim 1 wherein said decreasing numerical indicia marks are in the range of 60 down to 0.

6. The time teaching aid of claim 1 wherein said rotating face rotates a complete rotation in the clockwise direction in approximately 60 seconds.

7. The time teaching aid of claim 1 wherein said rotating face rotates a complete rotation in the clockwise direction in approximately 60 minutes.

8. The time teaching aid of claim 1 wherein a maximum size portion of the rotating face is exposed when the time hand and rotating face trailing edge are proximate said twelve-o'clock position.

9. The time teaching aid of claim 1 wherein a minimum size portion of the rotating face is exposed when the time hand and rotating face trailing edge are proximate said twelve-o'clock position.

10. The time teaching aid of claim 1 wherein a minimum value numerical indicia mark and a maximum value numerical indicia mark are generally proximate the same position on said stationary face.

11. The time teaching aid of claim 10 wherein said position of the minimum value numerical indicia mark and the maximum value numerical indicia mark is proximate the twelve-o'clock position on the stationary face.

12. A method for teaching the concept of remaining time and elapsed time to persons unfamiliar with determining time comprising:

providing a generally flat stationary face to be viewed by a person;

positioning a plurality of numerical indicia marks around the stationary face in a generally clockwise pattern with successive numerical indicia marks decreasing in numerical value in a clockwise direction from a twelve-o'clock position on the stationary face;

rotating another face in a clockwise direction around the stationary face and exposing an ever-decreasing portion of the rotating face as it rotates to visually indicate an ever-decreasing amount of time remaining for a particular task;

rotating, in a clockwise direction, a time hand in synchronization with the rotating face, the time hand pointing to numerical indicia marks having ever-decreasing numerical values so that the decreasing time remaining is indicated numerically;

the rotating face and time hand simultaneously indicating to said person the decreasing remaining time both proportionally and numerically on the stationary face;

whereby the person may readily visually associate numerical remaining time values with a decreasing exposed portion of the rotating face tounderstand remaining and elapsed time.

13. The method of claim 12 wherein the stationary face is slotted and the rotating face is slotted, the method further comprising:

directing a leading radial edge of the slotted rotating face into a slot in the stationary face to expose an ever-decreasing portion of the rotating face as it rotates.

14. The method of claim 12 comprising rotating the rotating face in a complete revolution around the stationary face in an interval of approximately 60 seconds.

15. The method of claim 12 comprising rotating the rotating face in a complete revolution around the stationary face in an interval of approximately 60 minutes.

16. The method of claim 12 comprising exposing a maximum size portion of the rotating face when the time hand is proximate said twelve-o'clock position.

17. The method of claim 12 comprising exposing a minimum size portion of the rotating face when the time hand is proximate said twelve-o'clock position after having rotated around said stationary face.

* * * * *